(12) United States Patent
Ma et al.

(10) Patent No.: US 7,925,112 B2
(45) Date of Patent: Apr. 12, 2011

(54) VIDEO DATA MATCHING USING CLUSTERING ON COVARIANCE APPEARANCE

(75) Inventors: Yunqian Ma, Roseville, MN (US); Isaac Cohen, Minnetonka, MN (US); Ben A. Miller, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1079 days.

(21) Appl. No.: 11/680,347

(22) Filed: Feb. 28, 2007

(65) Prior Publication Data

US 2008/0205773 A1    Aug. 28, 2008

(51) Int. Cl.
 *G06K 9/64*    (2006.01)
 *G06K 9/62*    (2006.01)
(52) U.S. Cl. ........................... 382/278; 382/225
(58) Field of Classification Search .................. 382/278, 382/103, 107, 225
 See application file for complete search history.

(56) References Cited

U.S. PATENT DOCUMENTS

| 5,568,192 | A | 10/1996 | Hannah |
| 6,954,544 | B2 * | 10/2005 | Jepson et al. ................. 382/107 |
| 7,636,450 | B1 | 12/2009 | Bourdev |
| 2007/0047811 | A1 | 3/2007 | Itoh et al. |
| 2007/0092110 | A1 | 4/2007 | Xu et al. |
| 2007/0098303 | A1 | 5/2007 | Gallagher et al. |
| 2008/0204569 | A1 | 8/2008 | Miller et al. |
| 2008/0226127 | A1 | 9/2008 | Brodsky et al. |
| 2009/0034791 | A1 | 2/2009 | Doretto et al. |
| 2009/0169168 | A1 | 2/2009 | Ishikawa |
| 2009/0175502 | A1 | 7/2009 | Bushell et al. |

FOREIGN PATENT DOCUMENTS

| EP | 0805405 A2 | 11/1997 |
| EP | 1184810 A2 | 6/2002 |
| WO | WO-03067884 A1 | 8/2003 |
| WO | WO-2006097680 A1 | 9/2006 |
| WO | WO-2006097681 A1 | 9/2006 |

OTHER PUBLICATIONS

Porikli, Fatih, et al., "Covariance Tracking Using Model Update Based on Means on Riemannian Manifolds", http://www.caip.rutgers.edu/riul/research/%20papers/abstract/covtrack.html, 2006 Computer Vision and Pattern Recognition Conference, New York City, NY, vol. I,(Jun. 2006),728-735.

(Continued)

*Primary Examiner* — Yon Couso
(74) *Attorney, Agent, or Firm* — Schwegman, Lundberg & Woessner P.A.

(57) ABSTRACT

Video data matching includes both a single region of data and sequences of regions of data. In an embodiment, a video processing system selects, from a first matrix row corresponding to a test appearance model, one or more other appearance models as a function of similarity measures populating the first matrix row. After selection of the one or more other appearance models, the system then selects, from other matrix rows corresponding to the one or more other appearance models selected in the first step, one or more additional appearance models as a function of the similarity measures populating the other matrix rows. The system then ranks the appearance models selected from the first matrix row and the other matrix rows.

14 Claims, 4 Drawing Sheets

OTHER PUBLICATIONS

Porikli, F., et al., "Covariance Tracking using Model Update Based on Lie Algebra", *Proceedings of the 2006 IEEE Computer Society Conference on Computer Vision and Pattern Recognition*, IEEE Computer Conference on New York, vol. 1. No. (1), (Jun. 2006), 728-735 pgs.

"U.S. Appl. No. 11/845,439, Non-Final Office Action mailed Jun. 9, 2010", 11 pgs.

"U.S. Appl. No. 11/845,439, Response filed Mar. 4, 2010 to Restriction Requirement mailed Feb. 4, 2010", 4 pgs.

"U.S. Appl. No. 11/845,439, Restriction Requirement mailed Feb. 4, 2010", 6 pgs.

"International Application No. PCT/US2008/055245, International Search Report mailed Feb. 17, 2009", 5 pgs.

"International Application No. PCT/US2008/055245, Written Opinion mailed Feb. 17, 2009", 9 pgs.

"RFC Services, Visual Hindsight IP Video Surveillance", (c) 2007 RFC Services. [online]. [archived Apr. 27, 2007]. Retrieved from the Internet: <URL: http://web.archive.org/web/20070427164211/http://www.visualhindsight.com/press_kit.htm>, (2007), 4 pgs.

"Video Analytics Terminology", (c)Video Analytics 2007. [online]. [archived May 1, 2007]. Retrieved from the Internent: <URL: http://web.archive.org/web/20070501191349/www.videoanalytics.org/pages/terminology.htm>, (2007), 4 pgs.

\* cited by examiner

|     | M1 | M2 | M3 | M4 | M5 | M6 | M7 | M8 | M9 |
|-----|----|----|----|----|----|----|----|----|----|
| M1  | 0  | 9  | 13 | 5  | 2  | 7  | 8  | 12 | 8  |
| M2  | 9  | 0  | 9  | 8  | 9  | 11 | 10 | 5  | 9  |
| M3  | 13 | 9  | 0  | 2  | 5  | 15 | 7  | 19 | 10 |
| M4  | 5  | 8  | 2  | 0  | 4  | 12 | 7  | 9  | 12 |
| M5  | 2  | 9  | 5  | 4  | 0  | 2  | 12 | 8  | 13 |
| M6  | 7  | 11 | 15 | 12 | 2  | 0  | 4  | 5  | 3  |
| M7  | 8  | 10 | 7  | 7  | 12 | 4  | 0  | 8  | 6  |
| M8  | 12 | 5  | 19 | 9  | 8  | 5  | 8  | 0  | 9  |
| M9  | 8  | 9  | 10 | 12 | 13 | 3  | 6  | 9  | 0  |

*FIG. 2*

VIDEO DATA MATCHING USING CLUSTERING ON COVARIANCE APPEARANCE

TECHNICAL FIELD

Various embodiments relate to the matching of objects in video data, and in an embodiment, but not by way of limitation, to the matching of objects using clustering on covariance appearance.

BACKGROUND

Security cameras have become ubiquitous in many environments including airports, shopping malls, and casinos. In the past, such cameras simply recorded the activity in the field of view of the camera, and that activity was monitored by security personnel in a security office. With the advent of faster processors, some automatic processing of such video data has become possible. However, processor-based security systems have difficulties in extracting useful information in multi-camera systems, such as associating people, vehicles and objects across non-overlapping cameras. These difficulties result from the differences in an object in the field of view, such as the object's size, the angle at which the object is viewed, the lighting available to a particular camera, and changes in an object between different cameras (such as a person removing his coat). The art of video surveillance would therefore benefit from a system that could address these difficulties.

BRIEF DESCRIPTION OF THE DRAWINGS

FIG. 2 illustrates an example embodiment of a covariance matrix for use in connection with sequence matching in video data using clustering as a function of covariance appearance.

SUMMARY

Figure 1:
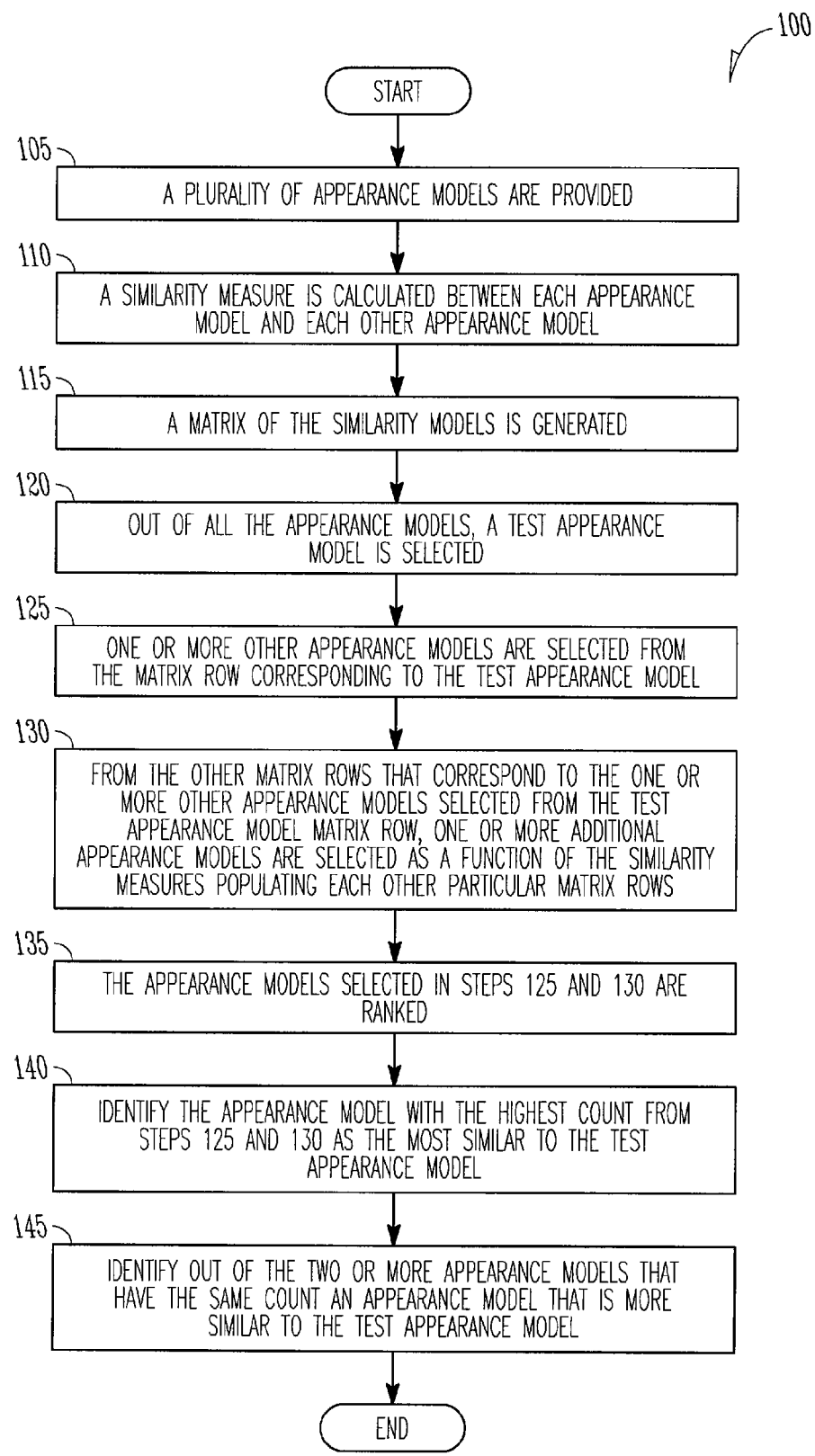
FIG. 1 illustrates an example embodiment of a process to sequence match in video data using clustering as a function of covariance appearance.

Video data matching includes both a single region of data and sequences of region data. In an embodiment, a video processing system selects, from a first matrix row corresponding to a test appearance model, one or more other appearance models as a function of similarity measures populating the first matrix row. After selection of the one or more other appearance models, the system then selects, from other matrix rows corresponding to the one or more other appearance models selected in the first step, one or more additional appearance models as a function of the similarity measures populating the other matrix rows. The system then ranks the appearance models selected from the first matrix row and the other matrix rows.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the fall range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i. e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In one or more embodiments, a system and method queries for corresponding video data. The video data can be one frame, or a region within the frame of data or sequences of frames, or regions within the frames for one object. Both the one frame, or a region within the frame data and the clusters of data (e.g. tracks, groups of regions sharing similar properties, etc) can be in a multiple camera surveillance system. One region within a frame or a blob (region) of data or one track corresponds to another region or blob (region) or another track when the same object or person appears in those frames or clusters (e.g., tracks). In the present system, an object's trajectory can appear in non-overlapping cameras. For example, for sequence matching, as a first step, multiple targets are tracked in each camera. After tracks for each individual camera are established, a covariance matrix is used as the appearance model for each region within the frame in a track. Agglomerative (or other type of clustering based on similarity) clustering regroups the similar regions within the frame in each track. The number of regions in each cluster is counted, and if the number of regions in a particular cluster is less than a threshold, that cluster is viewed as an outlier and it is not further processed. A calculation is made to determine a representative region for each valid cluster, so that each track is represented by several representative regions. An autocovariance-based appearance model is built for each region representing a particular cluster. The matching of similar tracks (or clusters) is then determined by calculating a Hausdorff distance between a query track (or cluster) and one or more candidates tracks or clusters.

In an embodiment of the system, it is assumed that motion detection and motion is readily available and tracks of individual people and/or objects might also be available (trajectories of objects may be available, but are not required) and are pre-stored. That is, it is a forensic analysis, where the operator (or an automated system) is performing a query (i.e., providing a template or region of interest) to the system, and the regions or tracks are readily available. Video data from a set of cameras is provided to an embodiment of the presently disclosed system, and the system runs all of its processing to associate people and objects in the video across all the cameras and stores the results in a data structure designed for quick query. The tracking whenever available provides a spatial-temporal description of detected moving regions in a field of view.

In an embodiment of the system, it is assumed that regions of interest (stationary people, moving people, stationary faces, moving faces, stationary vehicles, moving vehicles, moving regions, etc.) are readily available, and may be augmented with tracking information. That is, it is a forensic analysis, where the operator (or an automated system) is performing a query (i.e., providing a template or region of interest) to the system, and the regions or tracks are readily available. Video data from a set of cameras is provided to an embodiment of the presently disclosed system, and the system runs all of its processing to associate objects in the video data across all the cameras and stores the results in a data structure designed for quick query.

In an embodiment of the system, it is assumed that regions of interest (described above) are computed online (i.e., real-time) and is provided to an embodiment of the presently disclosed system, and the system runs all of its processing to associate objects with past observations in the video data across all the cameras and stores the results in a data structure designed for quick query.

Various embodiments of the disclosed video processing system focus on the query aspect of the system. That is, a user can search a video database by providing examples of the people and/or objects for whom they are looking. This is sometimes referred to as query by example. One use of the system is for determining actions taken before an event. For example, by examining the video data recorded by a security system in a place of business over the course of a week, one can determine the routes taken through a building by a particular person, or develop a list of all people someone interacted with while in a building that particular week.

In an embodiment, a covariance matrix based appearance model is used. Specifically, this covariance matrix appearance model is used to query both within a single camera and with multiple cameras. There are several advantages of the covariance appearance model. First, it can efficiently fuse many heterogeneous features. Second, it does not require motion information of objects and third can handle rigid and non-rigid objects observed by non-stationary cameras. Therefore it is robust to objects' pose and illumination changes which can occur when tracking across different cameras. This is particularly advantageous when the video repository contains video data from non-overlapping cameras, where the views of the different cameras can be different and the appearance of the objects might vary greatly in scale, pose, and shape.

In one particular embodiment of the system, the system performs its query of the video data based on a blob appearance model. In this embodiment, an appearance model for a blob is first defined. Since a goal of such a system is to support uncalibrated non-overlapping cameras, the appearance models have to be robust to changes in color, scale, pose, and other similar appearance factors.

To generate appearance models a covariance matrix based method is used. An advantage of this approach is the ability to fuse heterogeneous types of features, and it has a small dimensionality. Low dimensionality is beneficial when working with a large video repository. The covariance matrix is built over a feature set using the following equation where the feature set is given as $f_k$. The feature set is made up of spatial and appearance attributes.

$$f_k = [x, y, I(x,y), I_x(x,y), I_y(x,y)] \qquad (1)$$

And the covariance is defined by $$C = \Sigma (f_k - \mu_R)(f_k - \mu_R)^T \qquad (2)$$

The feature set $f_k$ defined above uses image intensity values. Other variations of $f_k$ may also be used such as the use of color images and the corresponding RGB descriptors:

$$f_k = [x, y, R(x,y), R_x(x,y), R_y(x,y), G(x,y), G_x(x,y), G_y(x,y), B(x,y), B_x(x,y), B_y(x,y)]$$

Other color spaces such as Hue-Saturation-Value (HSV), or YCrCb, or YUV and alike could be also considered.

After generating the covariance-based appearance models for every object in the system, the similarity of the models are compared. The distance between two models is given below in equation no. 3:

$$\rho(C_i, C_j) = \sqrt{\sum_{k=1}^{d} \ln^2 \lambda_k(C_i, C_j)} \qquad (3)$$

where $C_i$ represents the first model as a covariance matrix and $C_j$ the second model as a covariance matrix. The $\lambda_k(C_i, C_j)$ are the generalized eigenvalues of the appearance models $C_i$ and $C_j$ and can be obtained by solving the equation $$det(C_i - \lambda_k(C_i, C_j)C_j) = 0.$$

The matching method uses this distance metric to generate a set of matches that may be referred to as M for a queried model m. In an embodiment, the number of matches is determined by a percent of all models in the system, not a specific distance threshold. Using a percentage rather than a distance threshold allows the method to handle a broader set of models since all models are not held to the same similarity measure. This is beneficial since different cameras can have slightly different color values (variable camera gain). So, while setting a threshold might work within one camera very well, across all cameras the threshold may have to be higher to accommodate the difference in color and a consequently larger distance between models of the same object. The best matches for each of the elements in M are found using the same distance metric. This produces a set of appearance models that may be referred to as N. In this step, pruning is also performed. If the set of matches for an element in M does not contain the model m it is not added to N. The occurrence of models in the set N is then counted. This occurrence count is used to ranked the matches to the model m. Ties in count are handled by comparing the distance from an instance of a model and the model m that is being matched.

In another particular embodiment, the matching of persons and/or other objects in video data is performed by a method referred to as a query by sequences (or more generically known as many-to-many query). Like in the blob method, a covariance matrix is used as the appearance model. Also, as previously disclosed, the situation in a query by sequence is a forensic situation, i.e., motion detection and motion tracking are given. Motion detection provides a foreground mask, and tracking can track objects as they move through the scene recording their bounding rectangles and unique track ID.

Using the bounding rectangles and unique track ID from the tracking and the foreground mask from the motion detection as input, the appearance model for each region in the track (sequence) is computed. Like in the blob method explained above, Equation No. 2 is used to calculate a covariance matrix as the appearance model. The feature set (Equation No. 1) can be expanded to include any features such as edge detection, color intensity, scaled images, etc. In a specific embodiment, a feature set may include the color intensity of each channel R,G,B, the local pixel coordinates, and the x and y gradients in each color channel.

In a particular embodiment, the matching of persons and/or objects in video data is performed by query by sequences (many-to-many). The sequences are processed as follows: a sequence $S^{(k)}$ is composed of a finite number n regions. After preprocessing, each region is represented by its appearance model $C_i^{(k)}, i=1,2,\ldots,n$. For sequence representation, an objective uses a compact and descriptive set $r_j^{(k)}, j=1,\ldots,m$, where m<<n to represent sequence $S^{(k)}$, that is, $$S^{(k)}: C_i^{(k)}, i=1,2,\ldots,n \Rightarrow r_j^{(k)}, j=1,\ldots,m \quad (4)$$

In a first step, a clustering algorithm is performed on each region belonging to the sequence $C_i^{(k)}, i=1,2,\ldots,n$. One such clustering algorithm performs hierarchical agglomerative clustering. The implementation of the hierarchical agglomerative clustering is as follows, there are n initial groups, each of these groups containing only a single region. At each step, the closest pair of groups (clusters) are merged. As for the proximity between groups (clusters), an average linkage proximity can be used, which is the average pair-wise proximities (average length of edges), such that $$\text{proximity}=\text{average } \{\rho(C_i, C_j)\} \quad (5)$$

wherein $C_i$ and $C_j$ are from different groups (clusters). There are two ways to stop merging groups, one is to set the number of clusters and the other is to set the threshold of proximity between groups.

The resulting clusters may have valid clusters and invalid clusters. The invalid clusters are outliers. A relatively simple method may be used to determine outliers. For example, the number of objects within each cluster may be counted, and clusters with less than a threshold number of objects are deleted. The obtained clusters correspond to valid groups $G_1, \ldots, G_m$ wherein m is the number of valid groups. In each valid group, there are numbers of regions, so a representative region for each group is calculated.

Next, a representative region $r_k$ for each group $G_k$ is calculated, using the following formula:

$$i=\text{argmin}_{j=i}\Sigma(\rho(C_i, C_j)), i, j \subset 1, \ldots, n_k \quad (6)$$

wherein $n_k$ is the number of region within a valid group $G_k$. After the processing, each sequence (track) is represented by representative region, $r_1, \ldots r_m$, wherein m is the number of valid clusters for the sequence and m<<n. Therefore, the process can be summarized as first performing clustering on each regions' appearance model, here on the clustering on a covariance matrix $C_i^{(k)}, i=1,2,\ldots,n$ and using the distance as calculated by Equation No. (3), detecting an invalid group and removing them as outliers, and calculating the representative region $r_1, \ldots, r_m$ for valid groups $G_1, \ldots, G_m$.

As pointed out above, each sequence (track) is represented by representative regions, $r_1, \ldots, r_m$, wherein m is the number of valid clusters. Sequence matching can be performed between a query video data and video data stored in a database. A distance between query video data $S^{(q)}$ and candidate video data $S^{(p)}$ is defined. It is noted that several distance definition between sets can be used. One such distance is the Hausdorff distance for the distance between two sequences as listed below in Equation No. 7.

$$d(S^{(q)}, S^{(p)})=\max(\min(\rho(r_i^{(q)}, r_j^{(p)}))) \quad (7)$$

wherein $r_i^{(q)}$ is a representative region for valid clusters from the query video data and $r_i^{(p)}$ is a representative region for valid clusters from the queried (or candidate) video data respectively. To perform the actual query, the Hausdorff distance is compared, and the top 5% of sequences are identified from the database. Moreover, after the distance (Equation No. 7) between every two video data sequences are set up, the occurrence ranking method, described above 19, can be used for reporting the matches to the query.

FIG. 1 illustrates an example embodiment of a process 100 for sequence matching using clustering on covariance appearance. At 105, a plurality of appearance models are provided. Any type of an appearance model known in the art of video processing may be used. For example, in one or more embodiments, an appearance model consists of a fusion of the features of an object. Features may include such parameters as the height of an object, the shape of an object, and the color of an object, just to name a few. An object is a specific region in a video frame. At 110, a similarity measure is calculated between each appearance model and each other appearance model. At 115, a matrix of the similarity models is generated. At 120, out of all the appearance models, a test appearance model is selected. The test appearance model is the model that is going to be searched for in all of the other appearance models. For example, if there is a database of video surveillance data from shopping mall cameras, and one would like to determine where in the shopping mall a particular person was, then the appearance model for that person is selected, and it is used to compare against all the other appearance models generated by the system.

After the test appearance model is selected at 120, then at 125, one or more other appearance models are selected from the matrix row corresponding to the test appearance model. These one or more other appearance models are selected as a function of the similarity measures for all the models in that matrix row. In a particular embodiment, the one or more other appearance models are selected because their appearance models are similar to the test appearance model, as indicated by a relatively low similarity model number for that particular appearance model. After the similar appearance models are selected from the matrix row of the test appearance model, then at 130, from the other matrix rows that correspond to the one or more other appearance models selected from the test appearance model matrix row, one or more additional appearance models are selected as a function of the similarity measures populating each other particular matrix rows. At 135, the appearance models selected in steps 125 and 130 are ranked. In an embodiment, the appearance models are ranked by the number of times (or the count) that a particular appearance model was selected in steps 125 and 130.

At 140, the process 100 identifies the appearance model with the highest count from steps 125 and 130 as the most similar to the test appearance model. In some cases, two or more appearance models may have equal counts from steps 125 and 130. In such a case, the process 100 may, at 145, identify out of the two or more appearance models that have the same count, an appearance model that is more similar to the test appearance model. In an embodiment, this is determined as a function of the similarity measure of that appearance model in the matrix.

The appearance models of process 100 may originate from a plurality of video sensing devices comprising a plurality of fields of view. In general, the appearance models are calculated from a fusion of features of an object in a given image. In a particular embodiment, an appearance model is calculated by the following:

$$C = \Sigma (f_k - \mu_R)(f_k - \mu_R)^T;$$

wherein $\mu_R$ is a vector of the means of corresponding features for points within a region;

T indicates a transpose of the vector; and $$f_k = [x, y, I(x,y), I_x(x,y), I_y(x,y)];$$

wherein $f_k$ comprises a feature set of spatial attributes x y, I(x,y) corresponds to red, green, and blue channels at location x and y, $I_x(x,y)$ corresponds to an x gradient in red, green, and blue channels, and $I_y(x,y)$ corresponds to ay gradient in red, green, and blue channels. Additionally, the similarity measures may be calculated as follows:

$$\rho(C_i, C_j) = \sqrt{\sum_{k=1}^{d} \ln^2 \lambda_k (C_i, C_j)};$$

wherein d is a dimension of the matrix and $\lambda_k$ represents generalized eigenvalues of the appearance models $C_i$ and $C_j$.

FIG. 2 illustrates an example of a matrix 200 of similarity measures for several different video sensing devices M1-M9. For example, the value in location (M5, M7) represents the similarity measure between the appearance model M5 and M7, which in this example is equal to 12. Then, for example, if it is desired to query on M4 (that is, in what fields of view M1-M9 does the appearance model M4 appear), the M4 row is analyzed to determine which other appearance models are most similar to M4. A smaller number indicates that an appearance model is similar to another appearance model (and a value of 0 indicates that they are the same appearance models). Therefore, if the system is configured to return the three most similar appearance models, the query on M4 returns M3, M5, and M1. Then, similar queries are performed using the matrix rows corresponding to the appearance models M3, M5, and M1. For the M3 query, M4, M5, and M7 are returned. For the M5 query, M1, M6, and M4 are returned. And for the M1 query, M5, M4, and M6 are returned.

After the first and second queries, the counts of the appearance models are tallied. In this example, M1 was returned 2 times, M3 was returned 1 time, M4 was returned 3 times, M5 was returned 3 times, M6 was returned 2 times, and M7 was returned 1 time. In an embodiment, the system is configured to return the top 3 appearance models by count—in this example, M5, M1, and M6 (M4 was removed since it is the model on which the query is being performed). In this example, it is noteworthy that M3 was eliminated because while it was similar to the query model M4, it was not similar to any of the other appearance models that were similar to the query model.

A benefit of this system and method is that there is no threshold placed on the similarity metric. This is beneficial because an object will look different in different video sensing devices. Therefore, a single threshold would not hold across all of the devices. While a system could assign a threshold for every pair of video sensing devices in a system, for large systems that is a very time consuming task and it still does not account for dynamic differences in the devices such as lighting.

Figure 3:
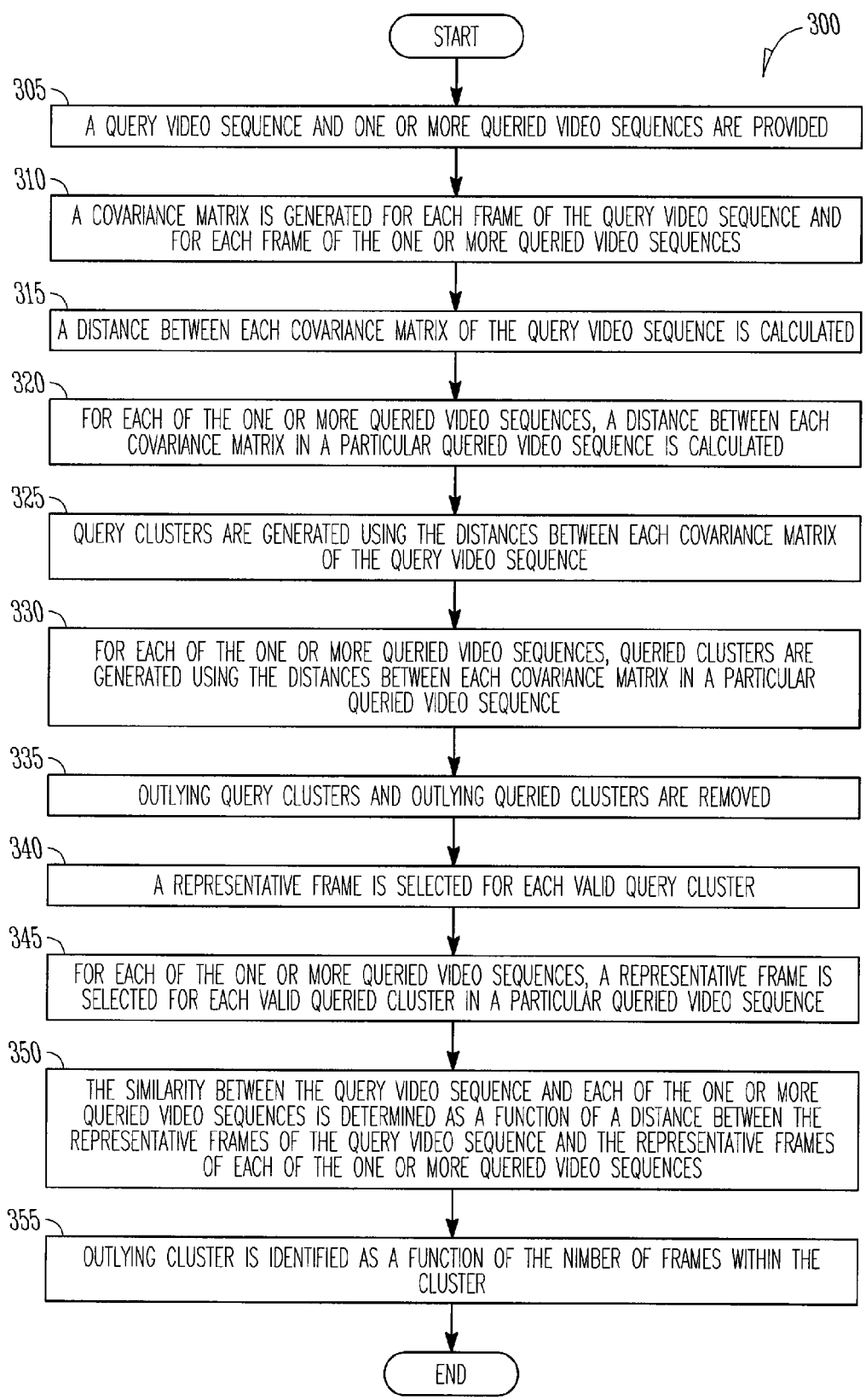
FIG. 3 illustrates another example embodiment of a process to sequence match in video data using clustering as a function of covariance appearance.

FIG. 3 illustrates another example embodiment of a process 300 for sequence matching using clustering on covariance appearance. At 305, a query video sequence and one or more queried video sequences are provided. The process 300 determines if the query video sequence is present in one or more of the queried video sequences. At 310, a covariance matrix is generated for each region of the query video sequence and for each region of the one or more queried video sequences. At 315, a distance between each covariance matrix of the query video sequence is calculated. Then, at 320, for each of the one or more queried video sequences, a distance between each covariance matrix in a particular queried video sequence is calculated. At 325, query clusters are generated using the distances between each covariance matrix of the query video sequence. At 330, for each of the one or more queried video sequences, queried clusters are generated using the distances between each covariance matrix in a particular queried video sequence. At 335, outlying query clusters and outlying queried clusters are removed. The removal of these outliers results in valid query clusters and valid queried clusters. At 340, a representative region is selected for each valid query cluster. At 345, for each of the one or more queried video sequences, a representative region is selected for each valid queried cluster in a particular queried video sequence. At 350, the similarity between the query video sequence and each of the one or more queried video sequences is determined as a function of a distance between the representative regions of the query video sequence and the representative regions of each of the one or more queried video sequences. In an embodiment, the covariance matrix of process 300 is made up of an x pixel position, a y pixel position, a red channel, a green channel, a blue channel, an x and y gradient for the red channel, an x and y gradient for the green channel, and an x and y gradient for the blue channel:

$$f_k = [x, y, R(x,y), R_x(x,y), R_y(x,y), G(x,y), G_x(x,y), G_y(x,y), B(x,y), B_x(x,y), B_y(x,y)]$$

In an embodiment, the distance between each covariance matrix is calculated by:

$$\rho(C_i, C_j) = \sqrt{\sum_{k=1}^{d} \ln^2 \lambda_k (C_i, C_j)};$$

wherein d is a dimension of the covariance matrix and $\lambda_k$ represents generalized eigen values of the appearance models; and $$C = \Sigma (f_k - \mu_R)(f_k - \mu_R)^T;$$

wherein $\mu_R$ is a vector of the means of corresponding features for points within a region;

T indicates a transpose of the vector; and $$f_k = [x, y, I(x,y), I_x(x,y), I_y(x,y)];$$

wherein $f_k$ comprises a feature set of spatial attributes x y, I(x,y) corresponds to red, green, and blue channels at location x and y, $I_x(x,y)$ corresponds to an x gradient in red, green, and blue channels, and $I_y(x,y)$ corresponds to ay gradient in red, green, and blue channels:

$$f_k = [x, y, R(x,y), R_x(x,y), R_y(x,y), G(x,y), G_x(x,y), G_y(x,y), B(x,y), B_x(x,y), B_y(x,y)]$$

At 355, an outlying cluster is identified as a function of the number of regions within the cluster.

In an embodiment, the representative region is selected by the following:

$$i = \arg\min_{j \neq i} \Sigma(\rho(C_i, C_j)), i, j \in 1, \ldots, n_k;$$

wherein $n_k$ represents the number of regions in the cluster k;

and $\rho(C_i, C_j)$ represents a distance between an ith region in the cluster and a jth region in the cluster.

The distance between the valid regions of the query video data and the valid regions of each of the one or more queried video data may be calculated as a Hausdorff distance.

Figure 4:
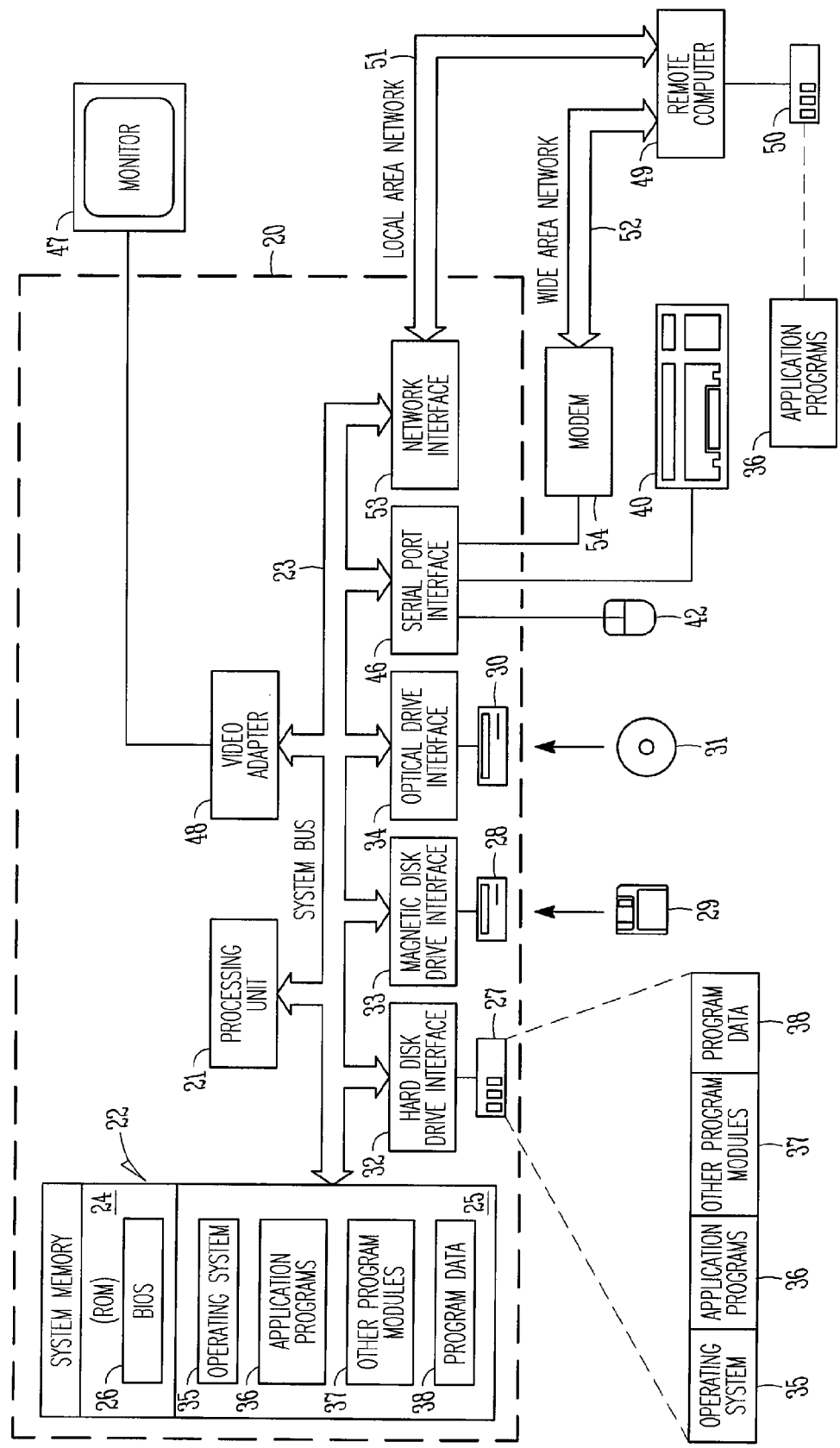
FIG. 4 illustrates an example embodiment of a computer system upon which one or more embodiments of the present disclosure may operate.

In the embodiment shown in FIG. 4, a hardware and operating environment is provided upon which one or more embodiments of the present disclosure may operate.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine can be resident on any one or number of these computer-readable media.

A user may enter commands and information into computer 20 through input devices such as a keyboard 40 and pointing device 42. Other input devices (not shown) can include a microphone, joystick, game pad, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the examples in the disclosure are not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the Internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description, various features are grouped together in one or more examples or examples for the purpose of streamlining the disclosure. This method of disclosure is not to be interpreted as reflecting an intention that the claimed examples of the invention require more features than are expressly recited in each claim. Rather, as the following claims reflect, inventive subject matter lies in less than all features of a single disclosed example. Thus the following claims are hereby incorporated into the detailed description as examples of the invention, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A non-transitory machine readable recording medium comprising instructions for executing a process on a computer comprising:
   (a) receiving a plurality of appearance models;
   (b) calculating a similarity measure between each appearance model and each other appearance model;
   (c) generating a matrix, the matrix comprising the similarity measures;
   (d) selecting a test appearance model out of the plurality of appearance models;
   (e) selecting, from a first matrix row corresponding to the test appearance model, one or more other appearance models as a function of the similarity measures populating the first matrix row;
   (f) selecting, from other matrix rows corresponding to the one or more other appearance models selected in step (e), one or more additional appearance models as a function of the similarity measures populating the other matrix rows; and
   (g) ranking the appearance models selected in steps (e) and (f).

2. The machine readable medium of claim 1, wherein the appearance models selected in steps (e) and (f) are ranked by count.

3. The machine readable medium of claim 2, further comprising instructions for identifying an appearance model with the highest count as the most similar to the test appearance model.

4. The machine readable medium of claim 3, wherein two or more appearance models have the same count, and further comprising identifying out of the two or more appearance models that have the same count, an appearance model that is more similar to the test appearance model as a function of the similarity measure of that appearance model in the matrix.

5. The machine readable medium of claim 1, wherein the appearance models originate from a plurality of video sensing devices comprising a plurality of fields of view, wherein the fields of view include one or more of a field of view that overlaps another field of view, and a field of view that does not overlap another field of view.

6. The machine readable medium of claim 1, wherein the appearance models comprise a fusion of features for an object in a frame.

7. The machine readable medium of claim 1, wherein the appearance model is calculated by:

$$c = \Sigma (f_k - \mu_R)(f_k - \mu_R)^T;$$

wherein
   $\mu_R$ is a vector of the means of corresponding features for points within a region;
   T indicates a transpose of the vector; and
   $f_k = [x, y, F(x,y)]$;
wherein $f_k$ comprises a feature set of spatial attributes x y, and F(x,y) corresponds to an arbitrary multi-dimensional function operating on a grey level or color information of video data.

8. The machine readable medium of claim 7, wherein the similarity measure is calculated by:

$$\rho(C_i, C_j) = \sqrt{\sum_{k=1}^{d} \ln^2 \lambda_k (C_i, C_j)};$$

wherein d is a dimension of the matrix and $\lambda_k$ represents generalized eigenvalues of the appearance models.

9. A system comprising:
   (a) a computer processor configured for receiving a plurality of appearance models;
   (b) a computer processor configured for calculating a similarity measure between each appearance model and each other appearance model;
   (c) a computer processor configured for generating a matrix, the matrix comprising the similarity measures;
   (d) a computer processor configured for selecting a test appearance model out of the plurality of appearance models;
   (e) a computer processor configured for selecting, from a first matrix row corresponding to the test appearance model, one or more other appearance models as a function of the similarity measures populating the first matrix row;
   (f) a computer processor configured for selecting, from other matrix rows corresponding to the one or more other appearance models selected in step (e), one or more additional appearance models as a function of the similarity measures populating the other matrix rows; and
   (g) a computer processor configured for ranking the appearance models selected in steps (e) and (f).

10. The system of claim 9, wherein the appearance models selected in steps (e) and (f) are ranked by count; and further comprising a processor configured for identifying an appearance model with the highest count as the most similar to the test appearance model.

11. The system of claim 10, wherein two or more appearance models have the same count, and further comprising a computer processor for identifying out of the two or more appearance models that have the same count, an appearance model that is more similar to the test appearance model as a function of the similarity measure of that appearance model in the matrix.

12. The system of claim 9, wherein the appearance models originate from a plurality of video sensing devices comprising a plurality of fields of view, wherein the fields of view include one or more of a field of view that overlaps another field of view, and a field of view that does not overlap another field of view.

13. The system of claim 9, wherein the appearance models comprise a fusion of features for an object in a frame.

14. The system of claim 9, wherein the appearance model is calculated by:

$$c = \Sigma (f_k - \mu_R)(f_k - \mu_R)^T;$$

wherein
- $\mu_R$ is a vector of the means of corresponding features for points within a region;
- T indicates a transpose of the vector; and
- $f_k = [x, y, F(x, y)]$;

wherein $f_k$ comprises a feature set of spatial attributes x y, and F(x,y) corresponds to an arbitrary multi-dimensional function operating on a grey level or color information of video data;

and wherein
the similarity measure is calculated by:

$$\rho(C_i, C_j) = \sqrt{\sum_{k=1}^{d} \ln^2 \lambda_k (C_i, C_j)};$$

wherein d is a dimension of the matrix and $\lambda_k$ represents generalized eigenvalues of the appearance models.

* * * * *